US012739245B2

(12) United States Patent
Anne et al.

(10) Patent No.: US 12,739,245 B2
(45) Date of Patent: Sep. 15, 2026

(54) METHODS FOR AUTHENTICATING AND INTEGRATING USER EQUIPMENT INTO AN INFORMATION SYSTEM, CORRESPONDING DEVICES AND COMPUTER PROGRAMS

(71) Applicant: ORANGE, Issy-les-Moulineaux (FR)

(72) Inventors: Matthieu Anne, Châtillon Cedex (FR); Samuel Berlemont, Châtillon Cedex (FR); Guilhem Martin, Châtillon Cedex (FR)

(73) Assignee: ORANGE, Issy-les-Moulineaux (FR)

(*) Notice: Subject to any disclaimer, the term of this patent is extended or adjusted under 35 U.S.C. 154(b) by 405 days.

(21) Appl. No.: 17/781,557

(22) PCT Filed: Dec. 1, 2020

(86) PCT No.: PCT/FR2020/052232
§ 371 (c)(1),
(2) Date: Jun. 1, 2022

(87) PCT Pub. No.: WO2021/111071
PCT Pub. Date: Jun. 10, 2021

(65) Prior Publication Data

US 2023/0006999 A1 Jan. 5, 2023

(30) Foreign Application Priority Data

Dec. 4, 2019 (FR) ....................................... 1913725

(51) Int. Cl.
*H04L 9/40* (2022.01)
*H04L 43/50* (2022.01)

(52) U.S. Cl.
CPC .......... *H04L 63/0876* (2013.01); *H04L 43/50* (2013.01)

(58) Field of Classification Search
CPC ..... H04L 63/0876; H04L 43/50; H04L 67/12; H04L 63/10; H04L 67/34; H04L 67/51;
(Continued)

(56) References Cited

U.S. PATENT DOCUMENTS 9,654,458 B1 * 5/2017 Bhaktwatsalam .. H04L 63/0876
10,574,654 B1 * 2/2020 Schroeder ............... H04L 63/10
(Continued)

FOREIGN PATENT DOCUMENTS

WO 2016209589 A1 12/2016
WO 2019156716 A1 8/2019

OTHER PUBLICATIONS

English translation of the Written Opinion of the International Searching Authority dated Jan. 22, 2021 for corresponding International Application No. PCT/FR2020/052232, filed Dec. 1, 2020.
(Continued)

*Primary Examiner* — Patrice L Winder
(74) *Attorney, Agent, or Firm* — David D. Brush; Westman, Champlin & Koehler, P.A.

(57) ABSTRACT

Methods for authenticating and integrating user equipment into an information system, corresponding devices and computer programs. Integration of new user equipment into an operator's information system uses communication protocols providing the authentication of the user equipment and guaranteeing integrity and confidentiality of messages exchanged between the user equipment and a user equipment management server of the information system. The user equipment is provided, at the time of manufacture, with an authentication certificate supplied to the manufacturer by the operator managing the information system in which the equipment is to be integrated. This requires cumbersome and inflexible logistics to implement and limits the choice of users as to which user equipment they might wish to
(Continued)

E1 Send MSG1
E2 Send MSG2
E3 Send MSG1'
E4 Send MSG3
E5 Send connection requests
E6 Check location
E7 Confirm location
E8 Send RQ1
E9 Send MSG4
E10 Send list of functions
E11 Determine instructions
E12 Send MSG5
E13 Send MSG6
E14 Receive test results - user equipment
E15 Receive test results - authenticated user equipment
E16 Authenticate user equipment
E17 Send MSG7
E18 Send connection request integrate. The proposed solution relies on an ecosystem of already authenticated user equipment present in the local network in order to authenticate the user equipment and thus authorize its integration into the information system.

16 Claims, 3 Drawing Sheets

(58) Field of Classification Search
CPC ......... G06F 21/44; H04W 4/38; H04W 24/02; H04W 84/12; H04W 4/70; H04W 12/08; G16Y 20/20; G16Y 40/35; G16Y 10/80
See application file for complete search history.

(56) References Cited

U.S. PATENT DOCUMENTS

| | | | | |
|---|---|---|---|---|
| 2008/0049779 | A1* | 2/2008 | Hopmann | H04L 41/0853 370/431 |
| 2010/0164693 | A1* | 7/2010 | Zhang | H04L 63/0823 340/10.31 |
| 2013/0318343 | A1* | 11/2013 | Bjarnason | H04L 63/08 713/157 |
| 2016/0036819 | A1* | 2/2016 | Zehavi | H04L 67/12 726/4 |
| 2017/0244597 | A1* | 8/2017 | Coote | H04L 41/0803 |
| 2017/0346848 | A1* | 11/2017 | Smith | H04W 4/70 |
| 2018/0332017 | A1* | 11/2018 | Childress | H04L 63/08 |
| 2019/0098021 | A1* | 3/2019 | Farmer | H04L 63/20 |
| 2019/0334807 | A1* | 10/2019 | Clark | H04L 43/0817 |
| 2019/0335333 | A1* | 10/2019 | Sohail | H04W 12/06 |
| 2019/0364049 | A1* | 11/2019 | Boss | G06F 21/45 |
| 2020/0125829 | A1* | 4/2020 | Cox | H04W 4/70 |
| 2020/0128017 | A1* | 4/2020 | Fox | H04L 63/126 |

OTHER PUBLICATIONS

Technical Report TR-069; CPE WAN Management Protocol v1.1, Version: Issue 1 Amendment 2, Version Date: Dec. 2007, Broadband Forum.
Technical Report TR-181, Device Data Model for TR-069, Issue: 2 Amendment 2, Issue Date: Feb. 2011, Broadband Forum.
Technical Report TR-064, LAN-Side CPE Configuration, Issue: 2, Issue Date: Aug. 2015, Broadband Forum.
International Search Report dated Jan. 14, 2021 for corresponding International Application No. PCT/FR2020/052232, Dec. 1, 2020.
Written Opinion of the International Searching Authority dated Jan. 14, 2021 for corresponding International Application No. PCT/FR2020/052232, filed Dec. 1, 2020.

* cited by examiner

14

401
hardware
processor 402
storage unit 403
interface 404
network
interface

405

METHODS FOR AUTHENTICATING AND INTEGRATING USER EQUIPMENT INTO AN INFORMATION SYSTEM, CORRESPONDING DEVICES AND COMPUTER PROGRAMS

CROSS-REFERENCE TO RELATED APPLICATIONS

This Application is a Section 371 National Stage Application of International Application No. PCT/FR2020/052232, filed Dec. 1, 2020, the content of which is incorporated herein by reference in its entirety, and published as WO 2021/111071 on Jun. 10, 2021, not in English.

FIELD OF THE DISCLOSURE

The field of the invention is that of the remote management of user equipment by an operator's information system by means of a communication network. More precisely, the invention relates to the integration of new user equipment into the operator's information system.

BACKGROUND OF THE DISCLOSURE

A remote management service of user equipment by an operator's information system by means of a communication network is carried out in a secure and trusted environment in order to guarantee the security, confidentiality and integrity of the data passing through the communication network and data stored in equipment belonging to this same communication network. An information system includes all of the user equipment management servers. These user equipment management servers interact with the user equipment through a management solution set up by the operator.

Thus, the integration of a new user equipment into an information system is performed by means of communication protocols ensuring the authentication of the user equipment to be integrated and guaranteeing the integrity and the confidentiality of messages exchanged between the user equipment to be integrated and a user equipment management server located in the communication network.

This solution is based on the fact that the items of user equipment to be integrated are provided, at the time of their manufacture, with an authentication certificate supplied to the manufacturer by the operator managing the information system in which the user equipment is to be integrated. Thus, during the integration process, the user equipment transmits its certificate to a user equipment management server that forms part of the information system of the operator. In the absence of such a certificate, the integration method of the user equipment with the information system is stopped.

A first disadvantage of such a solution is that it requires cumbersome and inflexible logistics in order to be implemented. Indeed, the operator managing the information system in which the user equipment is to be integrated has to provide the certificates to the various manufacturers of user equipment through a secure channel.

Another disadvantage of such a solution is the fact that the same operator managing the information system in which user equipment is to be integrated cannot provide certificates to large number of manufacturers of connected objects, thus limiting the choice of its users with regard to the connected objects they might wish to integrate, whereas the development of these connected objects offers an increasingly varied choice in terms of the functions implemented by these connected objects or in terms of design.

There is therefore a need to provide a technique for authenticating and integrating new user equipment into an information system that does not have all or some of these disadvantages.

SUMMARY

The invention addresses this need by proposing a method for integrating at least one item of user equipment of a local area network intended to be integrated into an information system, said method being implemented by a server interfacing the local area network and the information system and comprising the following steps:

- transmitting to the user equipment instructions relating to at least one test to be performed by said user equipment relating to at least one item of authenticated user equipment belonging to the local area network, said instructions being determined as a function of functions that can be executed by said user equipment and by said authenticated user equipment,
- when the results of the test are conclusive, transmitting to the user equipment connection parameters to at least one authenticated user equipment management server of the information system.

Such a solution relies on an ecosystem of user equipment already authenticated with the operator's information system and present in the local area network in order to authenticate the user equipment to be integrated into the information system and thus authorise its integration into the information system.

In order to ensure the security of the operator's information system, as long as the user equipment has not been authenticated, the latter is only authorised to communicate with a server interfacing the local area network and the information system. Thus, this intermediate server controls all of the message exchanges with the user equipment to be integrated. It allows the isolation of the user equipment to be integrated from the rest of the information system in charge of the integrated equipment which is involved in the authentication of the user equipment.

The user equipment to be integrated transmits information relating to at least one function that it can perform to the intermediate server. For example, when the user equipment is a connected lamp, the latter can turn on, turn off, change the colour of the light emitted, etc. All of this information is transmitted to the intermediate server which retransmits it to a test server.

Based on information relating to the user equipment transmitted by the intermediate server to the test server and information relating to other user equipment of the local area network that has already been authenticated and integrated into the information system, the test server transmits instructions relating to a test to be performed by the user equipment to be integrated. In the example selected, when the user equipment is a connected lamp and a connected light sensor has already been authenticated and integrated into the information system, the test server can for example transmit instructions to the user equipment to be integrated to switch on and emit a green light for a given period of time. At the same time, the connected light sensor detects the light emission produced by the test server.

The results of the test are sent back to the test server which determines whether or not they are conclusive. If the results are conclusive, i.e. if the light sensor has detected a sequence of light emissions in accordance with the test server's instruction, then the user equipment is authenticated. It is then authorised to connect to an authenticated user equipment management server located in the operator's information system and is therefore integrated into the information system.

According to a first feature of the integration method, information relating to at least one function that can be executed by said user equipment is received in response to a request transmitted to said user equipment.

This makes it possible to discover the features and capabilities of the user equipment to be integrated into the information system in order to deduce the tests to be performed.

According to a second feature of the integration method, the transmission of the request is triggered by receiving at least one piece of information about the presence of the user equipment in the local area network.

Thus, if it is determined that the user equipment is not actually located in the local area network, the integration method is stopped.

The invention also relates to a method for authenticating at least one item of user equipment of a local area network to be integrated into an information system, said method being implemented by a test server of the information system and comprising the following steps:

- receiving information about at least one function that can be executed by said user equipment,
- determining instructions relating to at least one test to be performed by said user equipment in relation to at least one item of authenticated user equipment belonging to said local area network as a function of functions that can be performed by said user equipment and by said authenticated user equipment,
- transmitting to the user equipment instructions relating to said at least one test to be performed,
- transmitting, via an authenticated user equipment management server of the information system, instructions relating to said at least one test to be performed to at least one authenticated item of user equipment,
- authenticating said user equipment based on test results received from said user equipment and from said at least one item of authenticated user equipment.

Such an authentication method uses already authenticated user equipment located in the local area network in order to authenticate the user equipment to be integrated in a safe and secure manner.

In an alternative embodiment of the integration method, the latter comprises a step of determining at least one trust parameter associated with at least one test result.

This may make it possible to limit the access of the user equipment to certain services provided via the information system.

In one variation of this alternative implementation of the authentication method, the trust parameter depends on the authenticated user equipment in relation to which the test is performed.

Indeed, according to whether the already authenticated user equipment has been authenticated in accordance with the present authentication method or because it was provided with a certificate at the time of manufacture, the trust parameter associated with at least one result of a test performed is not the same. A value of the trust parameter associated with the result of a test performed in relation to a user equipment with a factory certificate reflects a higher level of trust than a value of the trust parameter associated with the result of a test performed in relation to user equipment authenticated according to the present authentication method.

The subject-matter of the invention is also a server interfacing a local area network and an information system, the server comprising means for:

- transmitting to at least one item of user equipment, instructions relating to at least one test to be performed by said user equipment in relation to at least one item of authenticated user equipment belonging to the local area network, said instructions being determined as a function of functions that can be executed by said user equipment and by said authenticated user equipment,
- when the results of the test are conclusive, transmitting to the user equipment connection parameters to at least one authenticated user equipment management server of the information system.

The invention also relates to a test server capable of authenticating at least one item of user equipment of a local area network to be integrated into an information system, said test server comprising means for:

- receiving information relating to at least one function that can be performed by said user equipment,
- determining instructions relating to at least one test to be performed by said user equipment in relation to at least one authenticated user equipment belonging to said local area network as a function of functions that can be performed by said user equipment and by said authenticated user equipment,
- transmitting to the user equipment instructions relating to said at least one test to be performed,
- transmitting, via an authenticated user equipment management server of the information system, instructions relating to said at least one test to be performed to at least one item of authenticated user equipment,
- authenticating said user equipment based on test results received from said user equipment and said at least one item of authenticated user equipment.

The invention also relates to a computer-readable storage medium on which computer programs are stored comprising program code instructions for performing the steps of the methods according to the invention as described above.

Such a recording medium can be any entity or device capable of storing the programs. For example, the medium can comprise a storage means, such as a ROM, for example a CD ROM or a microelectronic circuit ROM, or a magnetic storage medium, for example a USB stick or a hard drive.

On the other hand, such a recording medium can be a transmissible medium such as an electric or optical signal, which can be conveyed via an electric or optical cable, by radio or by other means, so that the computer programs contained therein can be executed remotely. The programs according to the invention can in particular be downloaded onto a network, for example the internet.

Alternatively, the recording medium can be an integrated circuit in which the programs are incorporated, the circuit being adapted to execute or to be used for executing the aforementioned methods which are subject-matters of the invention.

BRIEF DESCRIPTION OF THE DRAWINGS

Other purposes, features and advantages of the proposed methods are explained in more detail in the following description, given simply by way of an illustrative and non-limiting example, with reference to the figures in which.

DETAILED DESCRIPTION OF ILLUSTRATIVE EMBODIMENTS

Figure 1:
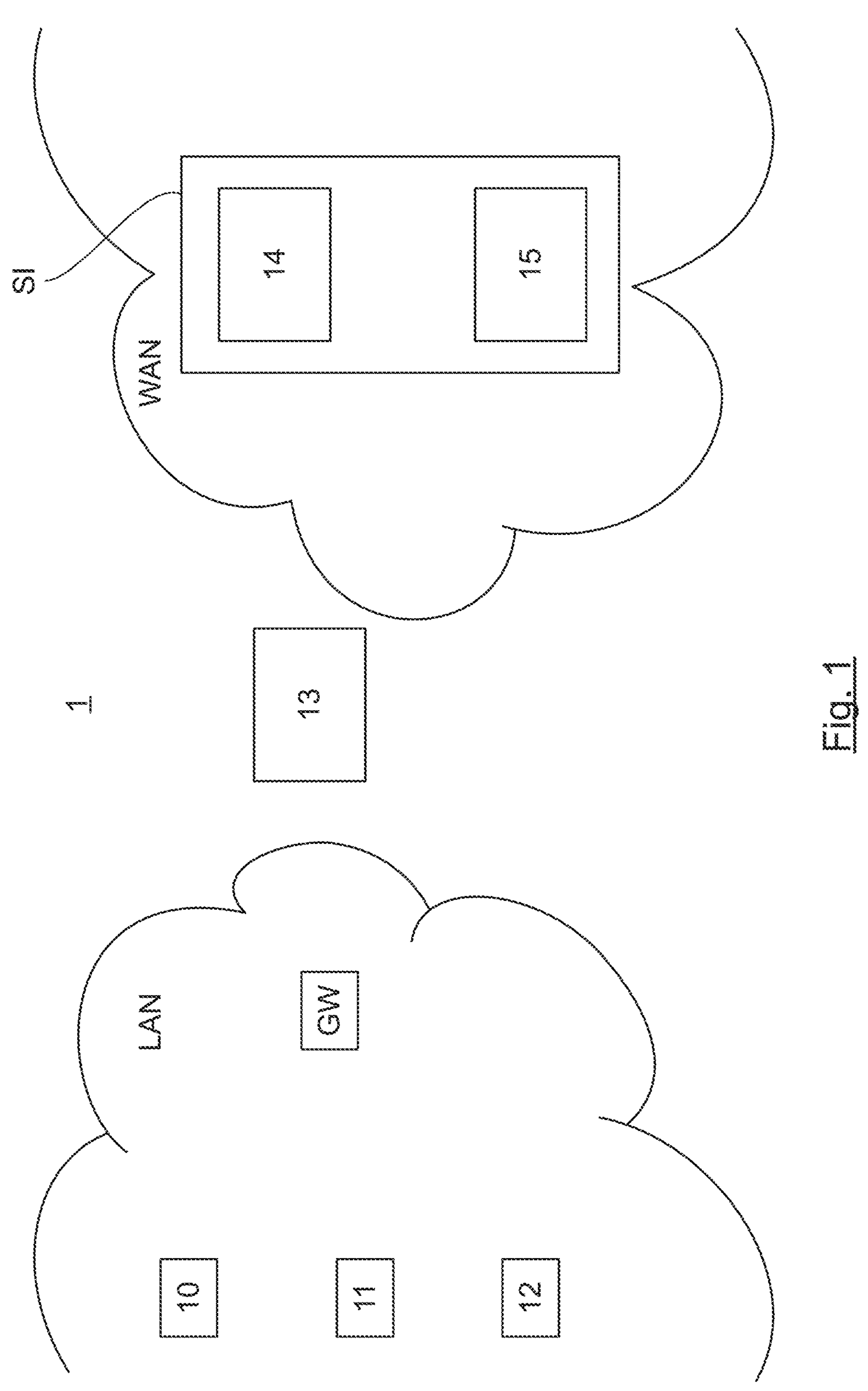
FIG. 1 shows schematically a system in which the proposed methods are implemented.

FIG. 1 shows schematically a system 1 in which the integration and authentication methods are implemented.

The system 1 consists of at least one LAN (Local Area Network) and an operator's information system IS located in a WAN (Wide Area Network).

The local area network LAN comprises a gateway GW allowing user equipment present in the local area network LAN to exchange data with remote equipment located in the communication network. A plurality of items of user equipment 10, 11, 12 are located in the local area network LAN. The items of user equipment 11 and 12 have already been authenticated and are integrated into the information system IS. The user equipment 11 has been authenticated by using the proposed methods while the user equipment 12 has a factory certificate. The user equipment 10 does not have a factory certificate and a local area network LAN user wants to integrate it into the information system IS, to allow remote management.

The user equipment 10, 11, 12 can be for example connected objects such as sensors, lamps, switches or even cell phones, tablets, TV decoders or set-top-boxes, connected speakers, connected household appliances, etc.

A server 13, referred to as an intermediate server, interfaces the local area network LAN with the WAN communication network.

The information system IS of the operator includes among other things a test server 14 and at least one management server 15 for authenticated user equipment 11, 12. The exchanges between the management server 15 and an authenticated item of user equipment are based on a protocol that describes the methods implemented by the management server as well as the user equipment, a software component implemented on the equipment, which both conform to the specifications related to the protocol. An example of such a protocol is CWMP—CPE WAN Management Protocol—defined in the technical report TR-069 specified by the Broadband Forum. Furthermore, the functionalities of the user equipment can be discovered through this protocol, for example through the data model defined in the technical report TR-181 for CWMP specified by the Broadband Forum. The management server 15 performs a set of user equipment administration and maintenance functions, such as firmware updates or reconfigurations.

In one embodiment, the intermediate server 13 and the test server 14 are functional components embedded in the same equipment of the information system IS.

Figure 2:
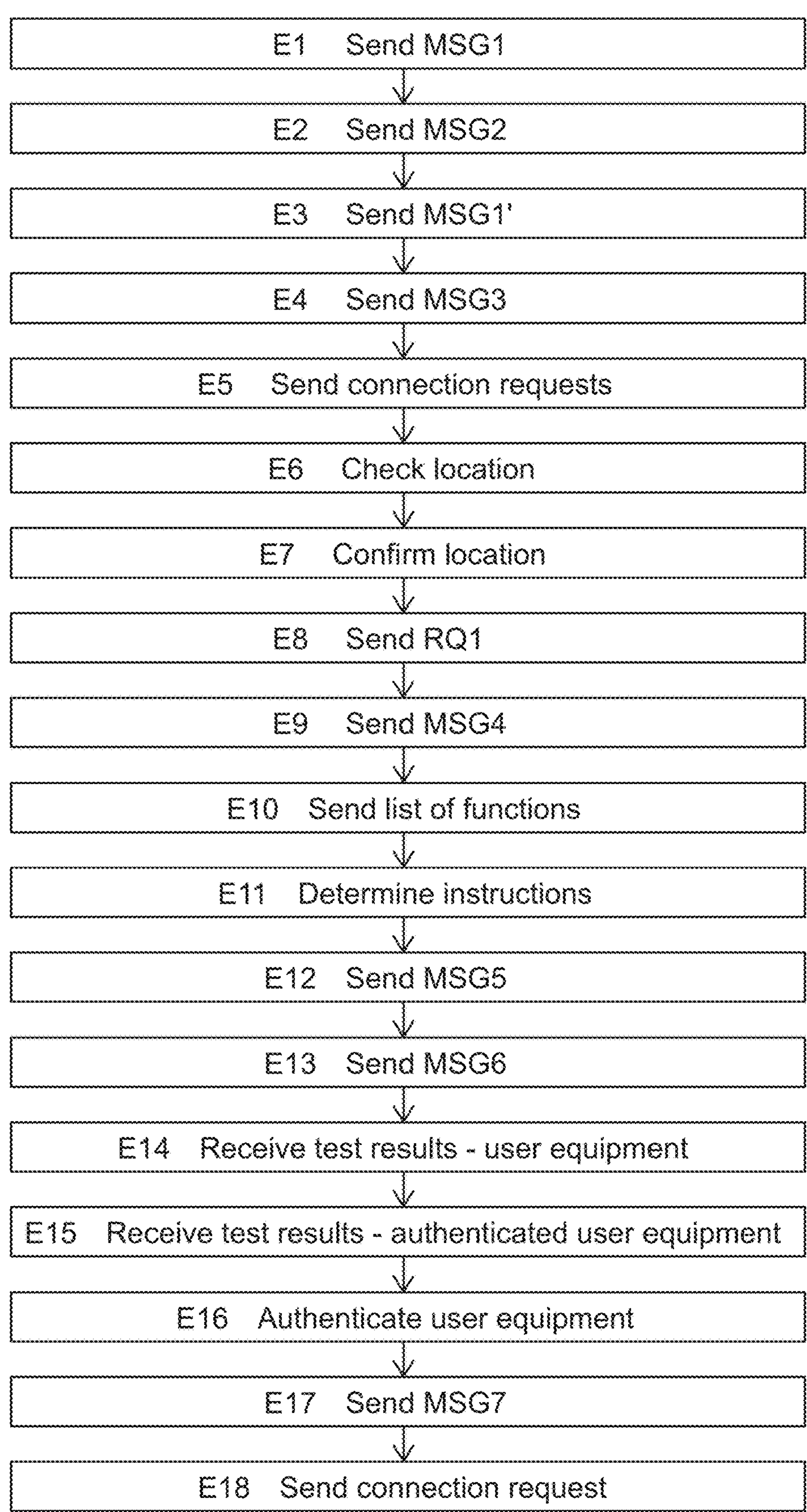
FIG. 2 shows the steps of integration and authentication methods implemented according to a particular embodiment.

FIG. 2 shows the steps of the integration and authentication methods in particular embodiments in order to authenticate an item of user equipment 10 and then to integrate it into the operator's information system IS.

In one step E1, the user equipment 10 transmits a message MSG1 to the gateway GW in order to initiate an integration method in the information system IS. Such a message MSG1 is for example a DHCP message (Dynamic Host Configuration Protocol) of the DHCP discovery type.

In step E2, the gateway GW determines that the user equipment 10 is not authenticated and transmits a message MSG2 to the user equipment including connection information to a boot server (not shown in the figures) located in the WAN communication network.

Thus, the message MSG2 is for example a message of the DHCPOffer type with a specific option. For example, this option can be DHCPv6 Vendor Class Option 16 (if the user equipment supports IPv6), DHCP Vendor Class Identifier Option 60, or DHCP V-I Vendor Class Option 124.

In a particular embodiment, the user equipment 10 is configured to store connection information to a boot server using a local interface (as defined in technical report TR-064 for the CWMP protocol, specified by the Broadband Forum).

In step E3, the user equipment 10 transmits in a new message MSG1', intended for the boot server, a request to initiate integration into the information system IS.

In step E4, the boot server transmits a message MSG3 to the user equipment 10 comprising connection information to the intermediate server 13, connection information to a first control module CM1 (not shown in the figures) located in the local area network LAN and connection information to a second control module CM2 (not shown in the figures) located in the WAN communication network.

In a particular embodiment, the message MSG3 does not include connection information. In this case, the intermediate server 13 and the management server 15 share the same IP address and the redirection is performed by a component in the information system IS. This component verifies whether the user equipment 10 is authenticated to redirect the communication to the management server 15 and if not to the intermediate server 13.

During step E5, the user equipment 10 transmits a first connection request to the first control module CM1. At the same time, the user equipment 10 transmits a second connection request to the second control module CM2.

In step E6, the first control module CM1 and the second control module CM2 determine whether the user equipment 10 is actually located in the local area network LAN. Such a determination consists for example of verifying that the user equipment 10 is connected to a Wi-Fi access point embedded in the gateway GW.

If it is determined, by at least of one of the first CM1 or second CM2 control module, that the user equipment 10 is not located in the local area network LAN, the integration is stopped because the user equipment 10 can potentially compromise the security of the local area network LAN and the information system IS. In such a case, the LAN user is informed of the situation.

If it is determined by the first or the second control module, that the user equipment 10 is located in the local area network LAN, the intermediate server 13 is informed of this in step E7, for example by receiving at least one piece of information about the presence of the user equipment 10 in the local area network LAN.

In step E8, the intermediate server 13 transmits to the user equipment 10 a request RQ1 transmitting information relating to at least one function that can be performed by the user equipment 10. For example, when the user equipment 10 is a connected lamp, the latter can turn on, turn off, change the colour of the emitted light, etc. Thus, the functions that can be executed by the user equipment 10 are: emitting light, turning off the light, changing the colour of the light. In another example, when the user equipment 10 is a connected speaker, the latter can play music, turn off, change the volume of the sound, etc. Thus, the functions that can be performed by the user equipment 10 are: emitting sound, turning off the sound, changing the volume of the sound, etc.

In step E9, the user equipment 10 transmits a message MSG4 to the intermediate server 13 comprising a list of functions that it can execute.

In step E10, the intermediate server 13 transmits to the test server 14 the list of functions that the user equipment 10 can execute.

In step E11, the test server 14 determines instructions relating to at least one test to be performed by the user equipment 10 in relation to at least one authenticated user equipment 11 or 12 as a function of functions which can be performed by the three pieces of user equipment 10, 11, 12.

Knowing an identifier of the local area network LAN in which the user equipment 10 is located, the test server 14 identifies items of authenticated user equipment 11, 12 present in the local area network LAN. Based on the functions that can be performed by the user equipment 10 and functions which can be executed by authenticated user equipment 11, 12, which are stored in a memory of the test server 14, the test server 14 selects at least one authenticated user equipment 11 or 12 with which the user equipment 10 performs the test. A test is always carried out by a pair of items of user equipment of which a first member is user equipment 10 and the second member is an authenticated user equipment.

In step E12, the test server 14 transmits, via the intermediate server 13, a message MSG5 to the user equipment 10 comprising the instructions relating to the test to be performed.

In step E13, the test server 14 transmits, via the management server 15, a message MSG6 to the authenticated user equipment 11 comprising the instructions relating to the test to be performed.

In the chosen example, when the user equipment 10 is a connected light and the authenticated user equipment 11 is a light sensor, the test server 14 can for example transmit instructions to the user equipment 10 to switch on and emit a green light for a given period of time. At the same time, the authenticated user equipment 11 receives instructions to detect the emission of a green light for a given period of time.

In step E14, the test server 14 receives, via the intermediate server 13, the results of the test performed by the user equipment 10. These results can consist of a message indicating that the user equipment 10 has executed the received instructions.

In step E15, the test server 14 receives, via the management server 15, the results of the test performed by the authenticated user equipment 11. These results are for example a message comprising information describing the phenomena captured by the authenticated user equipment 11 during the test, in the example selected the given period.

In one embodiment of the invention, the test server 14 associates a trust parameter with the result of the test performed according to the authenticated user equipment 11 or 12 in relation to which the test was performed.

Indeed, depending on whether the already authenticated user equipment has been authenticated according to the present authentication method for the user equipment 11, or because it was provided with a certificate at the time of its manufacture, for the user equipment 12, the trust parameter associated with the result of the test carried out is not the same. A value of the trust parameter associated with the result of the test performed in relation to the user equipment 12 with a factory certificate reflects a higher level of trust than a value of the trust parameter associated with the result of the test carried out in relation to the user equipment 11 authenticated according to the present authentication method.

In step E16, the test server 14 authenticates the user equipment 10 based on the received test results. Thus, when the results of the user equipment 10 indicate that it has executed the instructions received and the results of the user equipment 11 indicate that the phenomena captured by the authenticated user equipment 11 correspond to the instructions that were transmitted, the test server 14 authenticates the user equipment 10. Otherwise, the user equipment 10 is not authenticated and the local area network LAN user is informed.

In step E17, the test server 14 transmits to the user equipment 10 and via the intermediate server 13 a message MSG7 comprising connection parameters to the management server 15.

On receiving the message MSG7, the user equipment 10 transmits a connection request to the management server 15 based on the connection parameters included in the message MSG7, in step E18. When the user equipment 10 is actually connected to the management server 15, it is integrated into the information system.

Figures 3, 4:
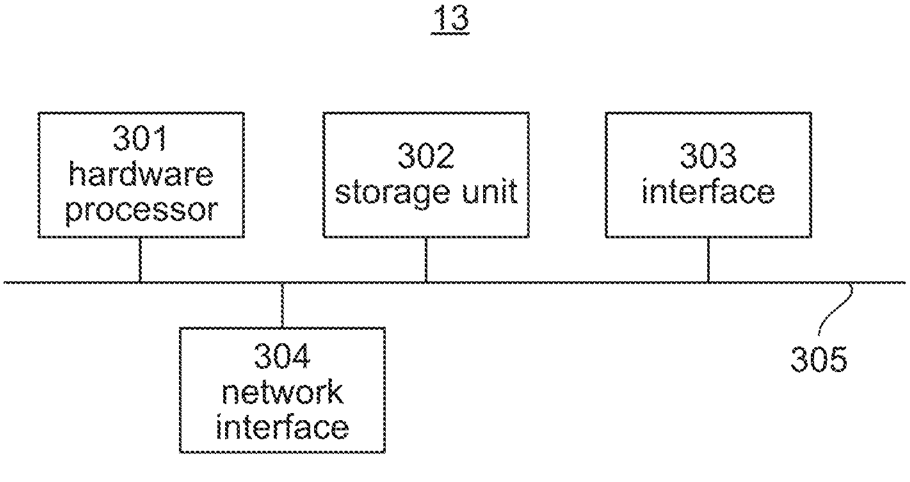
FIG. 3 shows the intermediate server according to a particular embodiment.
FIG. 4 shows the test server according to a particular embodiment.

FIG. 3 shows the intermediate server 13 according to one embodiment. Such an intermediate server 13 is configured to implement the various embodiments of the proposed methods described with reference to FIG. 2.

An intermediate server 13 can include at least one hardware processor 301, a storage unit 302, an interface 303, and at least one network interface 304 which are connected to one another via a bus 305. Of course, the component parts of the intermediate server 13 can be connected by a connection other than a bus.

The processor 301 controls operations of the intermediate server 13. The storage unit 302 stores at least one program for implementing the method according to one embodiment to be executed by the processor 301, and various data, such as parameters used for calculations performed by the processor 301, intermediate data of calculations performed by the processor 301, etc. The processor 301 can be formed by any known and suitable hardware or software, or by a combination of hardware and software. For example, the processor 301 can be formed by dedicated hardware such as a processing circuit, or by a programmable processing unit such as a central processing unit which executes a program stored in a memory thereof.

The storage unit 302 can be formed by any suitable means capable of storing the program or programs and data in a computer-readable manner. Examples of a storage unit 302 include non-transitory computer-readable storage media such as semi-conductor memory devices and magnetic, optical or magneto-optical storage media loaded into a read/write unit.

The interface 303 provides an interface between the intermediate server 13 and the user equipment 10 to be integrated.

At least one network interface 304 provides a connection between the intermediate server 13 and the first control module CM1, the second control module CM2, the test server 14 and the management server 15.

FIG. 4 shows the test server 14 according to one embodiment. Such a test server 14 is suitable for implementing the various embodiments of the method described with reference to FIG. 2.

A test server 14 can include at least one hardware processor 401, a storage unit 402, an interface 403 and at least one network interface 404 which are connected to one another via a bus 405. Of course, the components of the test server 14 can be connected by means of a connection other than a bus.

The processor 401 controls the operations of the test server 14. The storage unit 402 stores at least one program for implementing the method according to an embodiment to be executed by the processor 401, and various data such as parameters used for calculations performed by the processor 401, intermediate data of calculations performed by the processor 401 etc. The processor 401 can be formed by any known and suitable hardware or software, or a combination of hardware and software. For example, the processor 401 can be formed by a dedicated hardware such as a processing circuit, or by a programmable processing unit such as a central processing unit which executes a program stored in a memory of the latter.

The storage unit 402 can be formed by any suitable means capable of storing the program or the programs and data in a computer-readable manner. Examples of a storage unit 402 comprise non-transitory computer-readable storage media such as semi-conductor memory devices, and magnetic, optical or magneto-optical storage media loaded into a read/write unit.

The interface 403 provides an interface between the test server 14 and the management server 15.

At least one network interface 404 provides a connection between the test server 14 and the intermediate server 13.

Although the present disclosure has been described with reference to one or more examples, workers skilled in the art will recognize that changes may be made in form and detail without departing from the scope of the disclosure and/or the appended claims.

The invention claimed is:

1. An integration method for integrating at least one item of user equipment of a local area network intended to be integrated in an information system, said integration method being implemented by a server interfacing the local area network and the information system and comprising:

transmitting, to the user equipment, instructions relating to at least one test to be performed by a pair of items of equipment comprising said user equipment and at least one authenticated user equipment belonging to the local area network and selected based on at least one function performed by the user equipment, said authenticated user equipment being authenticated to at least one authenticated user equipment management server of the information system, said instructions being determined as a function of the at least one function and functions performed by said at least one authenticated user equipment, and in response to a result of the at least one test being conclusive, transmitting to the user equipment connection parameters to the at least one authenticated user equipment management server of the information system, said connection parameters allowing said user equipment to connect to the at least one authenticated user equipment management server.

2. The integration method according to claim 1, wherein information relating to the at least one function performed by said user equipment is received in response to a request transmitted to said user equipment.

3. The integration method according to claim 2, wherein the transmission of the request is triggered by receiving at least one piece of information on presence of the user equipment in the local area network.

4. The integration method according to claim 1, wherein said authenticated user equipment being authenticated to the at least one authenticated user equipment management server of the information system results in said authenticated user equipment being already integrated in said information system.

5. The integration method according to claim 1, wherein said at least one user equipment connecting to the at least one authenticated user equipment management server results in said at least one user equipment being integrated in said information system.

6. An authentication method for at least one user equipment of a local area network intended to be integrated into an information system, said authentication method being implemented by a test server of the information system and comprising:

receiving information relating to at least one function performed by said at least one user equipment, selecting at least one authenticated user equipment belonging to said local area network, based on said at least one function, said authenticated user equipment being authenticated to at least one authenticated user equipment management server of the information system, determining instructions relating to at least one test to be performed by a pair of items of equipment comprising said at least one user equipment and said at least one authenticated user equipment as a function of the at least one function and functions performed by said at least one authenticated user equipment, transmitting, via a server interfacing the local area network and the information system, instructions relating to said at least one test to be performed to the at least one user equipment, transmitting, via an authenticated user equipment management server of the information system, corresponding instructions relating to said at least one test to be performed to the at least one authenticated user equipment, and authenticating said at least one user equipment based on a result of the test received from said at least one user equipment and said at least one authenticated user equipment, said authenticating comprising, in response to the result of the test being conclusive, transmitting to the least one user equipment, via the server interfacing the local area network and the information system, connection parameters to the at least one authenticated user equipment management server of the information system, said connection parameters allowing said at least one user equipment to connect to the at least one authenticated user equipment management server.

7. The authentication method according to claim 6, comprising determining at least one trust parameter associated with the result of the test.

8. The authentication method according to claim 7, wherein the at least one trust parameter depends on the at least one authenticated user equipment in relation to which the test is performed.

9. The authentication method according to claim 8, wherein the at least one trust parameter depends on a presence of a factory certificate within the at least one authenticated user equipment.

10. The authentication method according to claim 6, wherein the instructions relating to at least one test to be performed by a pair of items of equipment comprise:

a first set of instructions to be performed by said at least one user equipment, and a corresponding second set of instructions to be performed by the at least one authenticated user equipment.

11. The authentication method according to claim 6, wherein said authenticated user equipment being authenticated to the at least one authenticated user equipment management server of the information system results in said authenticated user equipment being already integrated in said information system.

12. The authentication method according to claim 6, wherein said at least one user equipment connecting to the at least one authenticated user equipment management server results in said at least one user equipment being integrated in said information system.

13. A server for interfacing a local area network and an information system, the server comprising:

a processor; and a non-transitory computer-readable medium comprising program code instructions stored which when executed by a processor of the server configure the server to implement acts comprising:

transmitting, to at least one user equipment, instructions relating to at least one test to be performed by a pair of items of equipment comprising said user equipment and at least one authenticated user equipment belonging to the local area network and selected based on at least one function performed by the user equipment, said authenticated user equipment being authenticated to at least one authenticated user equipment management server of the information system, said instructions being determined as a function of the at least one function and functions performed by said at least one authenticated user equipment, in response to a result of the at least one test being conclusive, transmitting to the at least one user equipment connection parameters to the at least one authenticated user equipment management server of the information system, said connection parameters allowing said at least one user equipment to connect to the at least one authenticated user equipment management server.

14. A test server capable of authenticating at least one user equipment of a local area network intended to be integrated into an information system, said test server belonging to the information system and comprising:

a processor; and a non-transitory computer-readable medium comprising program code instructions stored which when executed by a processor of the test server configure the test server to implement acts comprising:

receiving information relating to at least one function performed by said at least one user equipment, selecting at least one authenticated user equipment belonging to said local area network, based on said at least one function, said authenticated user equipment being authenticated to at least one authenticated user equipment management server of the information system, determining instructions relating to at least one test to be performed by a pair of items of equipment comprising said at least one user equipment and said at least one authenticated user equipment as a function of the at least one function and functions performed by said at least one authenticated user equipment, transmitting, via a server interfacing the local area network and the information system, instructions relating to said at least one test to be performed to the at least one user equipment, transmitting, via an authenticated user equipment management server of the information system, corresponding instructions relating to said at least one test to be performed to the at least one authenticated user equipment, authenticating said at least one user equipment based on test results received from said at least one user equipment and said at least one authenticated user equipment, said authenticating comprising, in response to the result of the test being conclusive, transmitting to the least one user equipment, via the server interfacing the local area network and the information system, connection parameters to the at least one authenticated user equipment management server of the information system, said connection parameters allowing said at least one user equipment to connect to the at least one authenticated user equipment management server.

15. A non-transitory computer-readable medium comprising a computer program product stored thereon comprising program code instructions for implementing an integration method for integrating at least one item of user equipment of a local area network intended to be integrated in an information system, when the computer program is executed by processor of a server interfacing the local area network and the information system, the method comprising:

transmitting, to the at least one user equipment, instructions relating to at least one test to be performed by a pair of items of equipment comprising said user equipment and at least one authenticated user equipment belonging to the local area network and selected based on at least one function performed by the user equipment, said at least one authenticated user equipment being authenticated to at least one authenticated user equipment management server of the information system, said instructions being determined as a function of the at least one function and functions performed by said at least one authenticated user equipment, and in response to a result of the at least one test being conclusive, transmitting to the at least one user equipment connection parameters to at the least one authenticated user equipment management server of the information system, said connection parameters allowing said at least one user equipment to connect to the at least one authenticated user equipment management server.

16. A non-transitory computer-readable medium comprising a computer program product stored thereon comprising program code instructions for implementing an authentication method for at least one user equipment of a local area network intended to be integrated into an information system, when the computer program is executed by a processor of a test server of the information system, the authentication method comprising:

receiving information relating to at least one function performed by said at least one user equipment, selecting at least one authenticated user equipment belonging to said local area network, based on said at least one function, said at least one authenticated user equipment being authenticated to at least one authenticated user equipment management server of the information system, determining instructions relating to at least one test to be performed by a pair of items of equipment comprising said at least one user equipment and said at least one authenticated user equipment as a function of the at least one function and functions performed by said at least one authenticated user equipment, transmitting, via a server interfacing the local area network and the information system, instructions relating to said at least one test to be performed to the at least one user equipment, transmitting, via an authenticated user equipment management server of the information system, corresponding instructions relating to said at least one test to be performed to the at least one authenticated user equipment, and authenticating said at least one user equipment based on the test results received from said at least one user equipment and said at least one authenticated user equipment, said authenticating comprising, in response to the result of the test being conclusive, transmitting to the least one user equipment, via the server interfacing the local area network and the information system, connection parameters to the at least one authenticated user equipment management server of the information system, said connection parameters allowing said at least one user equipment to connect to the at least one authenticated user equipment management server.

* * * * *